(12) United States Patent
Diep

(10) Patent No.: US 11,032,524 B2
(45) Date of Patent: Jun. 8, 2021

(54) CAMERA CONTROL AND IMAGE STREAMING

(71) Applicant: Louis Diep, Sunnyvale, CA (US)

(72) Inventor: Louis Diep, Sunnyvale, CA (US)

(*) Notice: Subject to any disclaimer, the term of this patent is extended or adjusted under 35 U.S.C. 154(b) by 0 days.

(21) Appl. No.: 16/660,791

(22) Filed: Oct. 22, 2019

(65) Prior Publication Data
US 2020/0053326 A1 Feb. 13, 2020

Related U.S. Application Data

(63) Continuation of application No. 15/324,267, filed as application No. PCT/US2015/039168 on Jul. 6, 2015, now Pat. No. 10,491,865.

(60) Provisional application No. 62/021,669, filed on Jul. 7, 2014.

(51) Int. Cl.
H04N 9/47 (2006.01)
H04N 7/18 (2006.01)
H04W 4/80 (2018.01)
H04W 8/00 (2009.01)
H04W 76/30 (2018.01)
H04W 76/11 (2018.01)
H04N 5/232 (2006.01)
H04W 4/21 (2018.01)

(52) U.S. Cl.
CPC ......... *H04N 7/188* (2013.01); *H04N 5/23216* (2013.01); *H04N 7/183* (2013.01); *H04W 4/80* (2018.02); *H04W 8/005* (2013.01); *H04W 76/11* (2018.02); *H04W 76/30* (2018.02); *H04W 4/21* (2018.02)

(58) Field of Classification Search
CPC .... H04N 5/23216; H04N 7/183; H04N 7/188; H04N 5/23203; H04N 5/23206; H04N 13/239; H04N 13/296; H04N 5/2257; H04N 5/225; H04N 5/232
USPC ........................................................ 348/144
See application file for complete search history.

(56) References Cited

U.S. PATENT DOCUMENTS

| 5,648,897 | A | * | 7/1997 | Johnson | G05D 1/0038 700/259 |
|---|---|---|---|---|---|
| 5,751,339 | A | * | 5/1998 | Aramaki | H04N 7/147 348/14.13 |
| 2009/0195655 | A1 | * | 8/2009 | Pandey | G08B 13/19647 348/158 |
| 2010/0128103 | A1 | * | 5/2010 | Sim | H04N 21/4314 348/14.02 |
| 2012/0032795 | A1 | * | 2/2012 | Ishii | H04N 1/00159 340/539.1 |

(Continued)

*Primary Examiner* — Gims S Philippe

(57) ABSTRACT

Camera control and image streaming are described, including at least one camera or an apparatus associated with at least one camera. The camera or apparatus is configured to establish a first communication with a first device, where the first communication allows the first device to control the camera, including one or more of zooming the camera, panning the camera, and tilting the camera. The camera or apparatus is configured to establish a second communication with a second device, where the second communication allows the second device to control the camera, including one or more of zooming the camera, panning the camera and, tilting the camera. The first communication and/or the second communication may include streaming a view from the camera to a device or user. The camera may be carried by an unmanned flying object.

20 Claims, 13 Drawing Sheets

(56) References Cited

U.S. PATENT DOCUMENTS

2018/0095459 A1* 4/2018 Bachrach ............... B64C 39/00

* cited by examiner

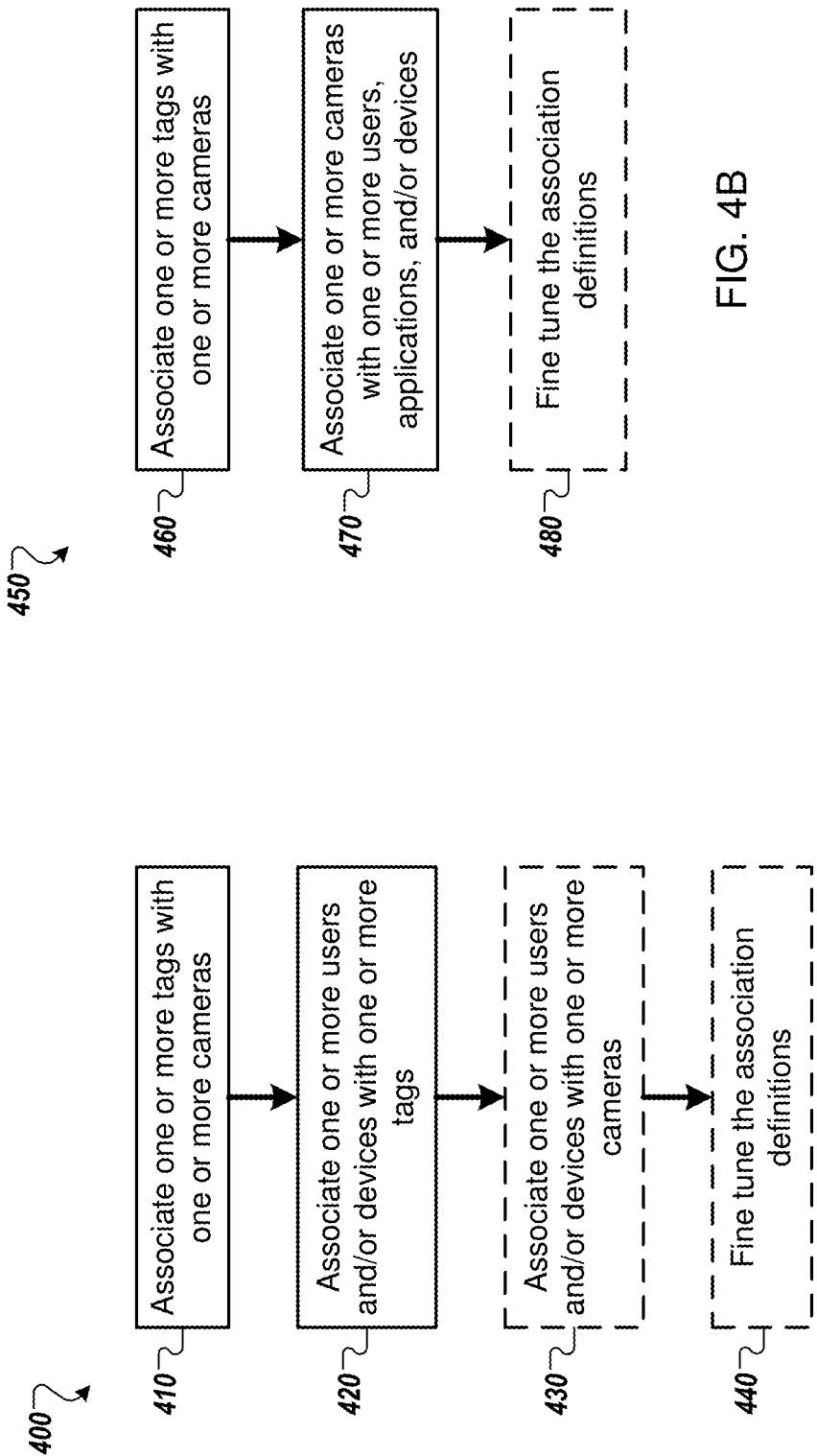

CAMERA CONTROL AND IMAGE STREAMING

CROSS-REFERENCE TO RELATED APPLICATIONS

This application is a continuation of U.S. patent application Ser. No. 15/324,267, filed Jan. 6, 2017, which is a National Stage Application under 35 U.S.C. 371 from International Patent Application Serial No. PCT/US2015/039168, filed on Jul. 6, 2015, published on Jan. 14, 2016 as WO 2016/007398 A1, which claims the benefit of priority to U.S. Provisional Patent Application Ser. No. 62/021,669, filed on Jul. 7, 2014, each of which is incorporated herein by reference in its entirety.

TECHNOLOGICAL FIELD

The subject matter described herein relates generally to image capturing and, more particularly, to camera control and image streaming.

BACKGROUND

Cameras cannot easily be used or placed in some locations to take pictures (images) or videos. For example, it is not easy to use or position cameras at certain locations, such as above a tree or pole to take pictures of a skiers doing somersaults.

Even if there is access to such a location, it is likely that only a few people can use the location at a time. In some situations, many people may want to take pictures and/or videos from the same location (e.g., to capture the same view or scene) with different subjects (e.g., skiers) in the pictures. Another situation where many people may want to take pictures of the same view is taking pictures of graduates receiving their diplomas at a graduation.

Subjects, such as skiers, skaters, etc., may want to capture their images while jumping a ram or flipping a somersault. The subjects would have to rely on other people to take pictures for them.

SUMMARY

Camera control and image streaming are described, including at least one camera or an apparatus associated with at least one camera. The camera or apparatus is configured to establish a first communication with a first device, where the first communication allows the first device to control the camera, including one or more of zooming the camera, panning the camera, and tilting the camera. The camera or apparatus is configured to establish a second communication with a second device, where the second communication allows the second device to control the camera, including one or more of zooming the camera, panning the camera and, tilting the camera.

In some example implementations, the first communication and/or the second communication may include streaming a view from the camera to a device or user.

In some example implementations, the camera may be carried by an unmanned flying object.

In some example implementations, the camera or apparatus is configured to receive a request from the first device to capture an image or video; capture an image or video using the camera; and provide the image or video to the first device or a user.

In some example implementations, the camera or apparatus is configured to provide the image or video a storage.

In some example implementations, the camera or apparatus is configured to, without receiving a request to capture an image or video, capture an image or video using the camera; and provide the image or video to the first device or a user.

In some example implementations, the camera or apparatus includes a microphone, a speaker, or both.

At least some of the example implementations described herein may be implemented as methods (e.g., methods implemented using devices, cameras and/or apparatuses). At least some of the example implementations described herein may be implemented as computer-readable media with computer program code stored thereon, the computer-readable media and computer program code, when executed on at least one processor of an apparatus, camera, or device, are configured to implement the example cameras and/or apparatus described herein Implementations are not limited to the examples implementations described herein.

BRIEF DESCRIPTION OF THE DRAWINGS

FIG. 4A shows a flowchart of an example process implementation for associating cameras with tags, devices, and/or users according to some example implementations.

FIG. 4B shows a flowchart of an example process implementation for associating devices and/or users with cameras and/or tags according to some example implementations.

DETAILED DESCRIPTION

The subject matter described herein is taught by way of example implementations. These examples are not intended to limit the scope of protection. The example apparatuses, methods, and systems described herein may be embodied in a variety of other forms. Various omissions, substitutions, and modifications to the examples described herein may be made without departing from the scope of protection. Various details have been omitted for the sake of clarity and to avoid obscuring the subject matter. The examples shown and described below are directed to structures and functions for implementing camera control and image streaming.

Figure 1A:
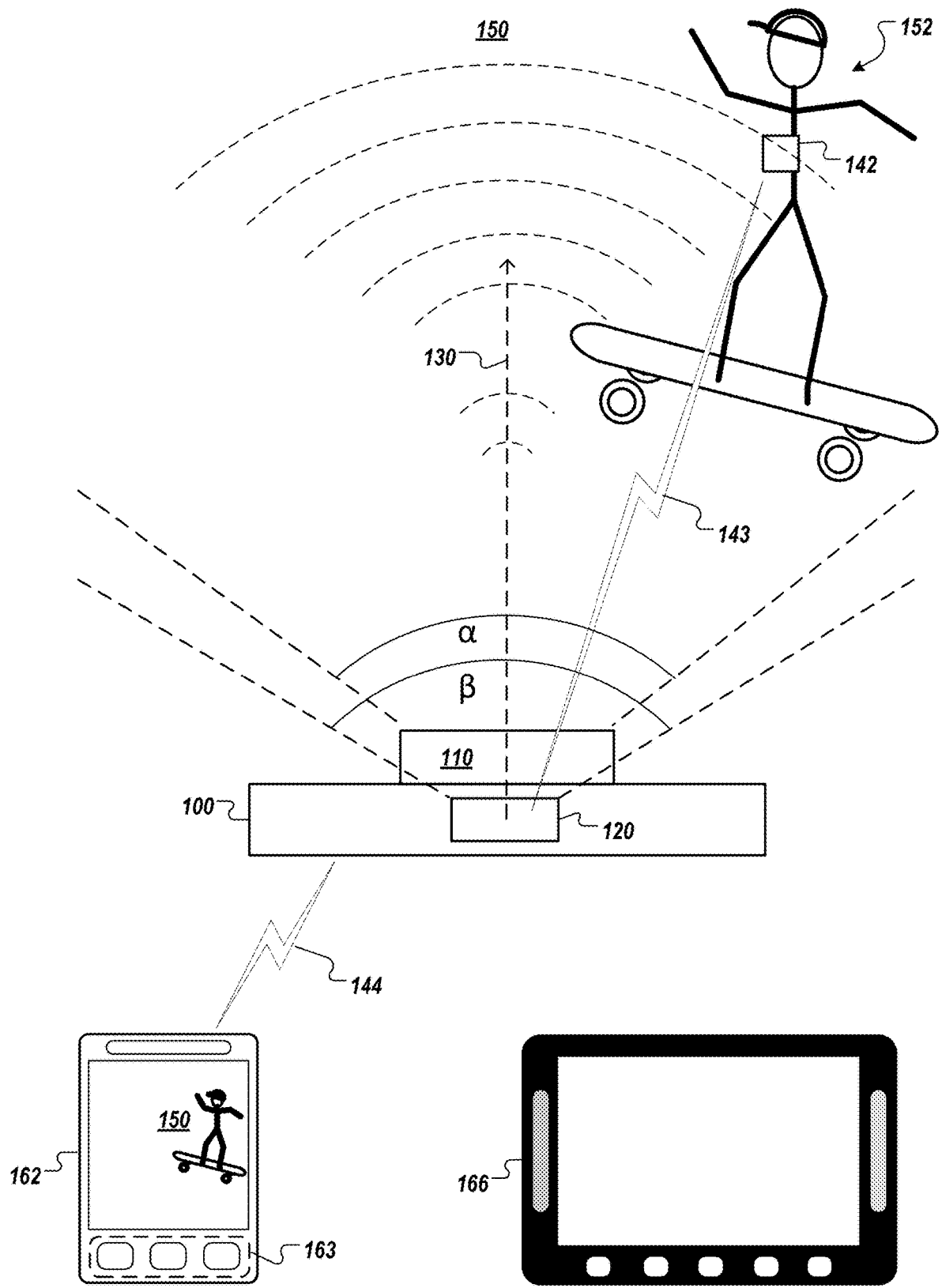
FIG. 1A shows an example environment where at least one camera is implemented according to some example implementations.

FIG. 1A shows an example environment where at least one camera 100 is implemented according to some example implementations. Camera 100 includes, for example, at least one lens 110 and at least one sensor 120. Camera 100 may include other components (e.g., flash, not shown).

Lens 110 has an angle α, which may be referred to as angle of view or field of view. Angle α may be fixed or variable (e.g., in any range between fisheye, ultra-wide, wide, standard, telephoto, and ultra-telephoto). Angle α of lens 110 is associated with the focal length of lens 110 (e.g., the focal length of the lens is the distance between the lens and the image sensor when the subject is in focus). The wider the angle α, the shorter the focal length.

Sensor 120 may be omnidirectional or directional. If sensor 120 is directional, the direction from which sensory information or signals are detected may be aligned substantially with the focal direction of lens 110 or may be pointed to a direction not aligned with the focal direction of lens 110. A directional sensor 120 has an angle β (e.g., the angle of signal reception) that may or may not be the same or substantially the same as angle α of lens 110. In some implementations, angle β may be wider or narrower than angle α.

When camera 100 receives a tag (e.g., inputted by a user or another device) or detects a tag (e.g., tag 142), camera 100 may determine if the tag is associated with any devices (e.g., device 162), users, or both. If there are any associated devices, camera 100 may establish communication with the devices based on the functions of the tag. If there are any associated users (not shown), camera 100 may establish communication with the users based on the functions of the tag (e.g., allows the users to access camera 100). In some implementations, a tag, regardless if is received, provided, or detected, the tag may automatically expire after a period of time (e.g., one minute, five minutes, 10 minutes, 30 minutes, one hour, two hours, etc.). After the expiration, a tag is no longer valid or active, unless it is received or detected again.

For example, camera 100 may detect tags in areas near sensor 120. Sensor 120 may be a passive sensor (e.g., a receiver, such as a radio receiver, infrared receiver, etc.), an active sensor (e.g., a scanner, a radio frequency identification (RFID) tag reader, etc.), or both.

A tag (e.g., tag 142) can be any information that can be used as a unique identifier (e.g., that uniquely identifies one tag from another tag). Tags may include passive tags (e.g., QRcodes, barcodes, RFID tags, images, etc.) and/or active tags (e.g., a transmitter, such as an infrared signal transmitter, a radio transmitter, etc.). In some implementations, a tag may be carried or worn by a person, or article of clothing/accessory, etc.

FIG. 1A shows an example active sensor 120. For example, sensor 120 may send or emit reading or scanning signals 130. In respond to signals 130, tag 142 may be detected. In some implementations, tag 142 may be an active tag. In response to signals 130, tag 142 or a device (not shown) associated with tag 142, may send tag 142 (e.g., information about tag 142, as shown with signal 143). Tag 142 may be in close proximity with subject 152 (e.g., a skateboarder). For example, tag 142 may be located to ensure subject 152 is in the field of view of lens 110 when sensor 120 detects tag 142.

After receiving or detecting signal 143 (e.g., tag 142), camera 100 may determine that tag 142 is associated with one or more devices and/or users (e.g., device 162 or a user who is happened to be using device 162, collectively referred to as device 162). Camera 100 (camera 100 may also refers to a device or system, not shown, that controls camera 100) may establish communication 144 with device 162. Communication 144 may include streaming of view 150, the view of lens 110, to device 162. The streaming may be of any quality or resolution, from the actual resolution of lens 110 to a lower resolution and/or quality (e.g., on image compression and/or frame per second), based on the functions associated with tag 146.

User of device 162 may be allowed to, based on tag 142, request image or video capturing using, for example, controls 163 of device 162. For example, when a user presses an appropriate control 163 (e.g., a "Take a Picture" button, not shown) or a user interface widget (not shown), the input is sent to camera 100, which, in response to the input or request, captures one or more images and sends the captured images to device 162, to an account of the user using device 162, or to a cloud storage or hosting storage for the user to access.

In some implementations, a tag (e.g., tag 142) may trigger automatic capturing of images and/or videos without user intervention (e.g., without any user initiation, such as pressing a control 163). For example, when camera 100 detects tag 142 or detects tag 142 then after a threshold delay (e.g., 0.2 second), camera 100 automatically captures one or more images and/or videos and sends the captured images and/or videos to device 162, to an account of the user using device 162, or to a cloud storage or hosting storage for the user to access.

Figure 1B:
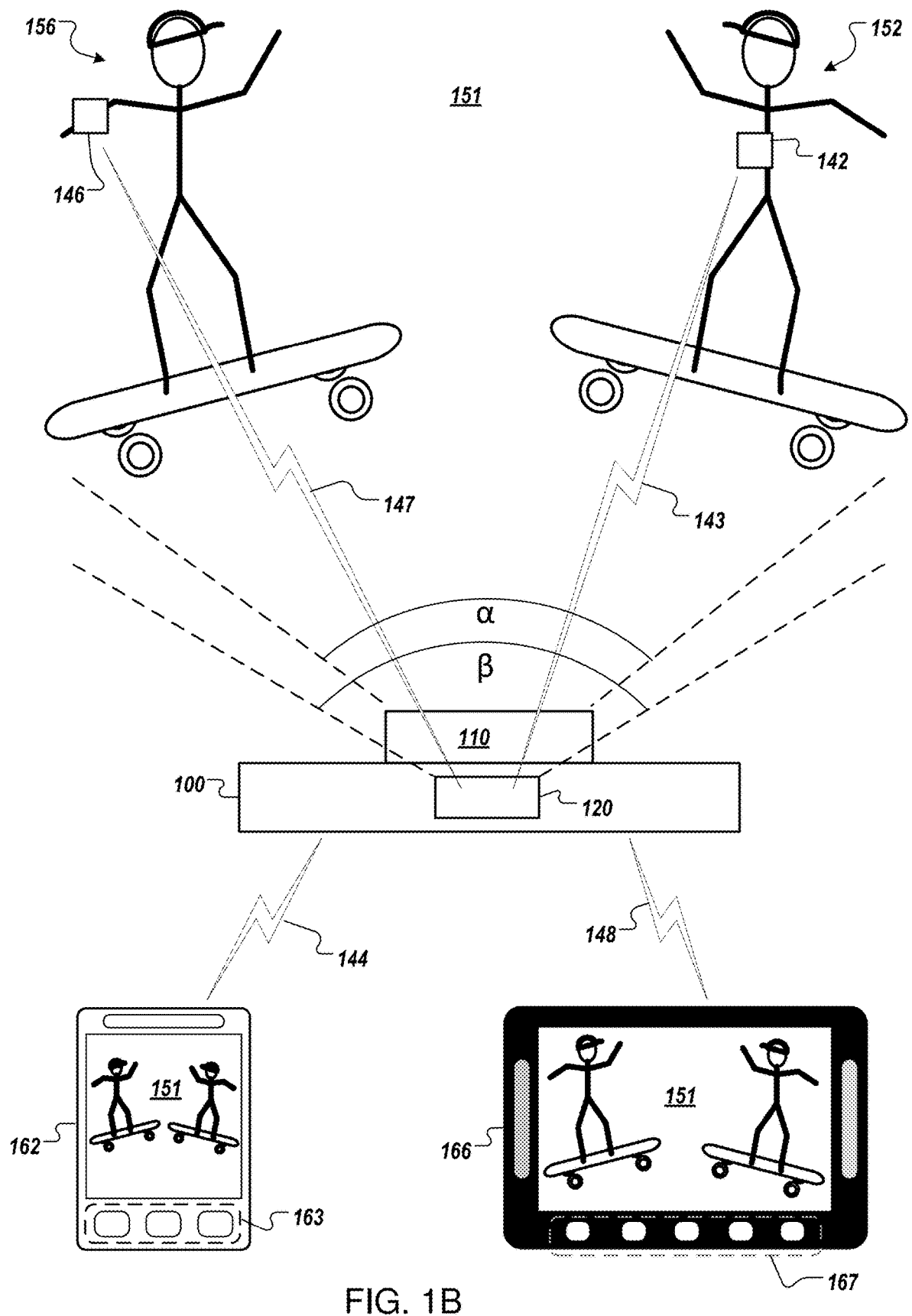
FIG. 1B shows the example environment of FIG. 1A where the camera is implemented in another example situation.

FIG. 1B shows the example environment of FIG. 1A where camera 100 is implemented for another example situation. Sensor 120 may receive or detect tags periodically or continuously. For example, sensor 120 may send or emit reading or scanning signals 130 (not shown in FIG. 1B) periodically or continuously. In addition to tag 142, sensor 120 may receive or detect tag 146 (e.g., carried or worn by subject 156). Signal 147 represents sensor 120 detecting tag 146.

After receiving or detecting signal 147 (e.g., tag 146), camera 100 may determine that tag 146 is associated with one or more devices and/or users (e.g., device 166 or a user who is happened to be using device 166, collectively referred to as device 166). Camera 100 may establish communication 148 with device 166. Communication 148 may include streaming of view 151, the view of lens 110, to devices 162 and 166. The streaming to device 166 may be of any quality or resolution, based on the functions associated with tag 146. Note that communication 144 between camera 100 and device 162 continues due to the present of tag 142. The communication 144 may include streaming current view 151 to device 162.

User of device 166 may be allowed to, based on tag 146, request image or video capturing using, for example, controls 167 of device 166. For example, when a user presses an appropriate control 167 (e.g., a "Take a 10-Second Video" button or "Start Recording" button, not shown) or a user interface widget (not shown), the input is sent to camera 100, which, in response to the input or request, captures or starts capturing a video. If the user has previously started recording of a video, the user may press another control 167 (e.g., a "Stop Recording" button, not shown) to stop the recording. Camera 100 then sends the captured video to device 166, to an account of the user using device 166, or to a cloud storage or hosting storage for access by the user who sends the request.

If tag 146 triggers automatic capturing of images and/or videos, camera 100, when detects tag 146 or detects tag 146 then after a threshold delay (e.g., 0.1 second), automatically captures one or more images and/or videos and sends the captured images and/or videos to device 166, to an account of the user using device 166, or to a cloud storage or hosting storage for access by the user.

In some implementations, a device itself (e.g., device 162 or 166) may be used as a tag to trigger a communication to the device. For example, when device 162 or 166 is within range of a network (e.g., local network) to which camera 100 is communicatively connected, camera 100 detects the present of the device (e.g., detecting the present of a unique identifier associated with the device or a component of the device, such as a near field communication component) and establishes a communication (e.g., communication 144 or 148) to the device.

Figure 1C:
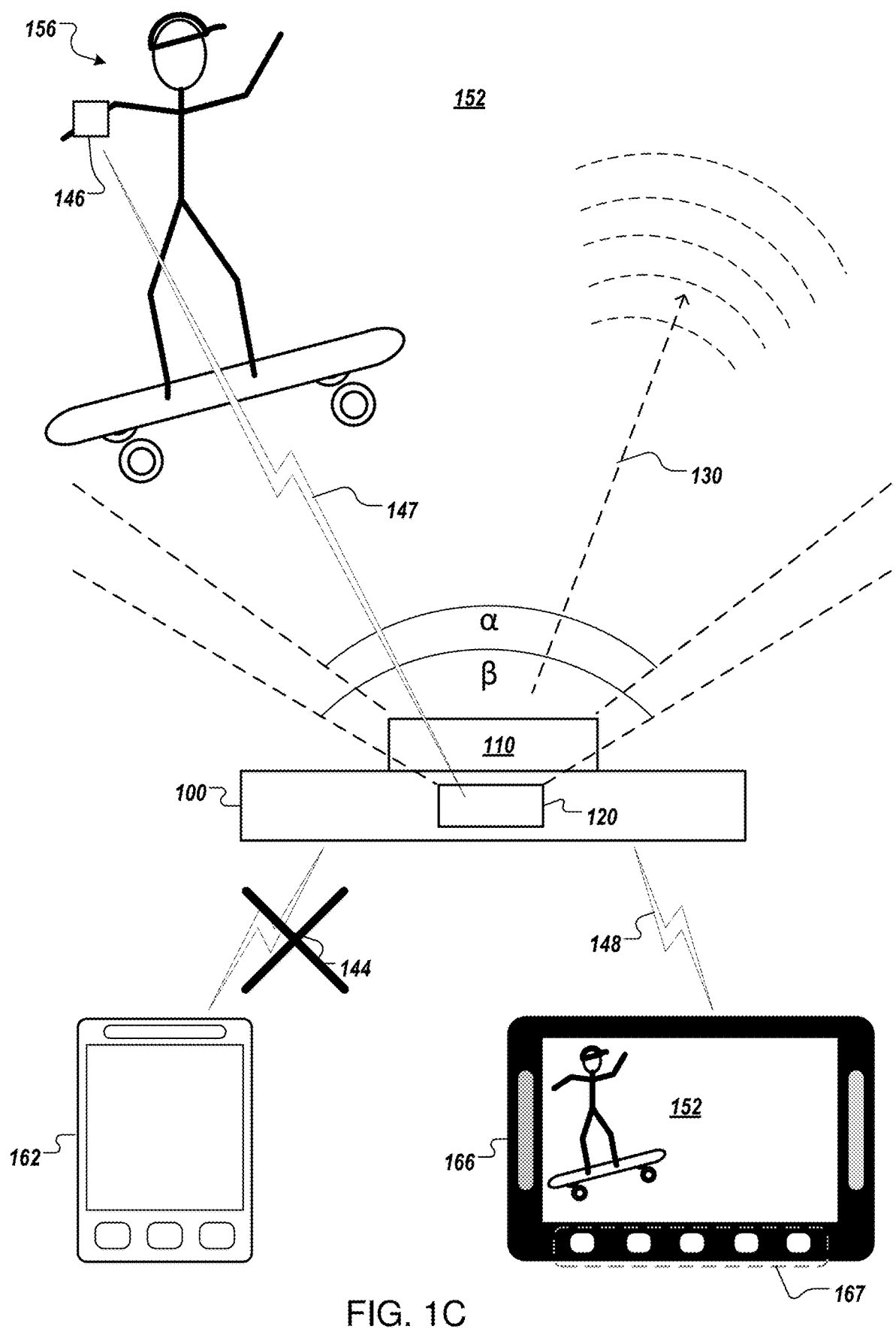
FIG. 1C shows the example environment of FIG. 1A where the camera is implemented in yet another example situation.

FIG. 1C shows the example environment of FIG. 1A where the camera is implemented for yet another example situation. Sensor 120 may receive or detect tags or the absent of tags periodically or continuously. For example, when sensor 120 sends or emits reading or scanning signals 130, tag 142 that was present (e.g., detected or received) before is now absent (e.g., not detectable). If tag 142 is previously detected or received by camera 100, tag 142 may be removed, deleted, or canceled by a user or expired after a period of time. Tag 142 is considered absent after removal, deletion, cancelation, or expiration. In response to the absent of tag 142 or failing to detect tag 142, the communication 144, associated with tag 142, may be terminated, as represented by device 162 not showing view 152. Note that communication 148 between camera 100 and device 166 continues due to the present or continue detection of tag 146. The communication 148 may include streaming current view 152 to device 166.

Figure 1D:
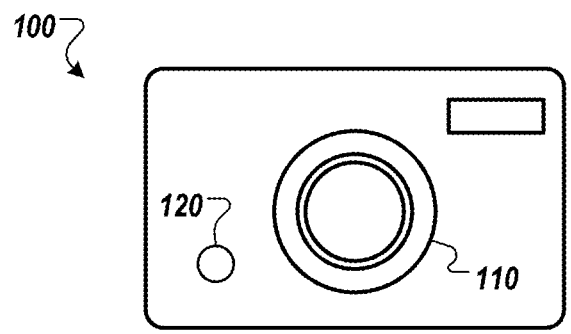
FIG. 1D shows a perspective view of an example camera according to some example implementations.

FIG. 1D shows a perspective view of an example camera according to some example implementations. Camera 100 may be any device that is capable of capturing or recording images (still images and/or sequence of images that can be used to form videos or animations). Camera 100 can be any device, such as a smartphone, a computer, etc. that includes or is associated with at least one lens 110 (e.g., a lens attached to another device, such as a single-lens reflex device, another smartphone, another computer, etc.). Further, a camera 100 may be of any size and may be positioned or mountable on a stationary or moving object (e.g., carried by a person or an unmanned flying object that may be referred to as a drone).

Camera 100 includes at least lens 110 and one or more sensors 120. Lens 110 may be any lens, which may be a fixed lens or changeable lens. Sensors 120 may be any sensor that is capable of receiving information or detecting a signal (e.g., an infrared signal, radio signal, radio frequency identification (RFID) signal, QRcode, barcode, etc.) that indicates a unique tag associated with receiving and/or capturing images and/or videos (e.g., functions associated with the unique tag). Sensors 120 may be part of camera 100 or separate from camera 100 (e.g., sensors of another device, smartphone, tablet, etc.) communicatively coupled to camera 100 to provide sensory information to camera 100 or directly control camera 100 based on sensory information.

Camera 100 includes other components (not shown), such as a flash light, control buttons, other sensors, and/or display terminal.

Figure 1E:
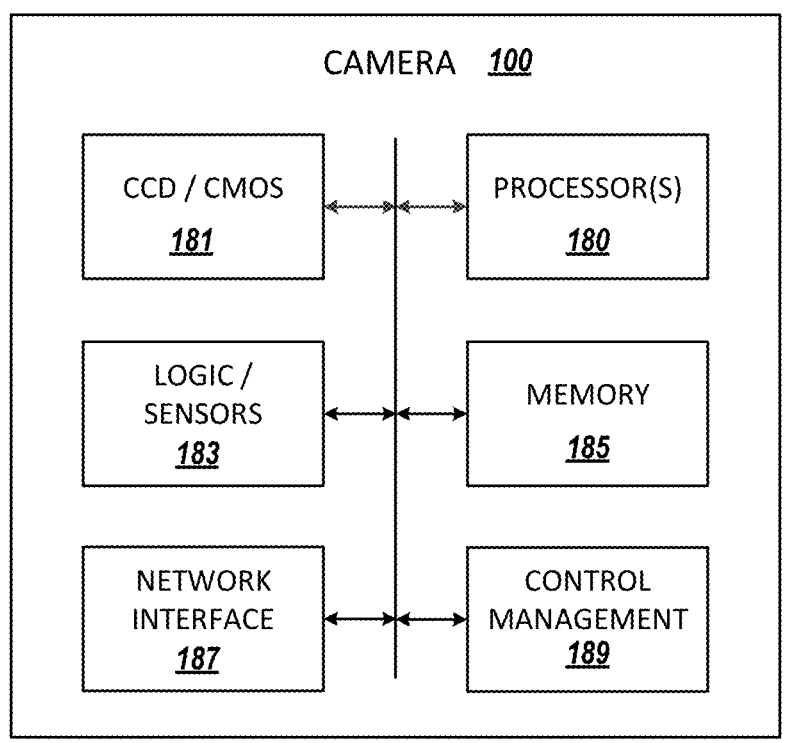
FIG. 1E shows example components of a camera according to some example implementations.

FIG. 1E shows example components of a camera according to some example implementations. Camera 100 may be a digital camera (e.g., not capturing images on film) that includes at least one image sensor, such as charge-coupled device (CCD), complementary metal-oxide semiconductor (CMOS), and/or other light/image capturing sensor (collectively referred to as CCD/CMOS 181) for capturing images and/or videos. Camera 100 includes logic circuitry and sensors 183, which may include at least one sensor 120 and a microphone (not shown); one or more processors 180 (e.g., for processing images captured by CCD/CMOS 181); and memory 185 (e.g., for storing the captured and/or processed images and/or videos). In some implementations, an image sensor (e.g., a CCD/CMOS sensor 181) may be used as passive sensor 120 for tags detection. Processors 180 may be executing software to implement one or more user interfaces and/or processes shown in FIGS. 3A-5.

Camera 100 may include network interface 187 for networking or communicating with other devices (e.g., devices 162 and 166). Camera 100 may include control management 189 to allow, for example, device 162 and/or 166 to control camera 100 (e.g., take images and/or videos, pan and/or tilt camera 100, zoom lens 110, etc.). If camera 100 is associated with an apparatus, the apparatus may include the equivalent functions of control management 189 to allow devices and/or user to control camera 100 (e.g., take images and/or videos, pan and/or tilt camera 100, zoom lens 110, etc.).

Figure 2A:
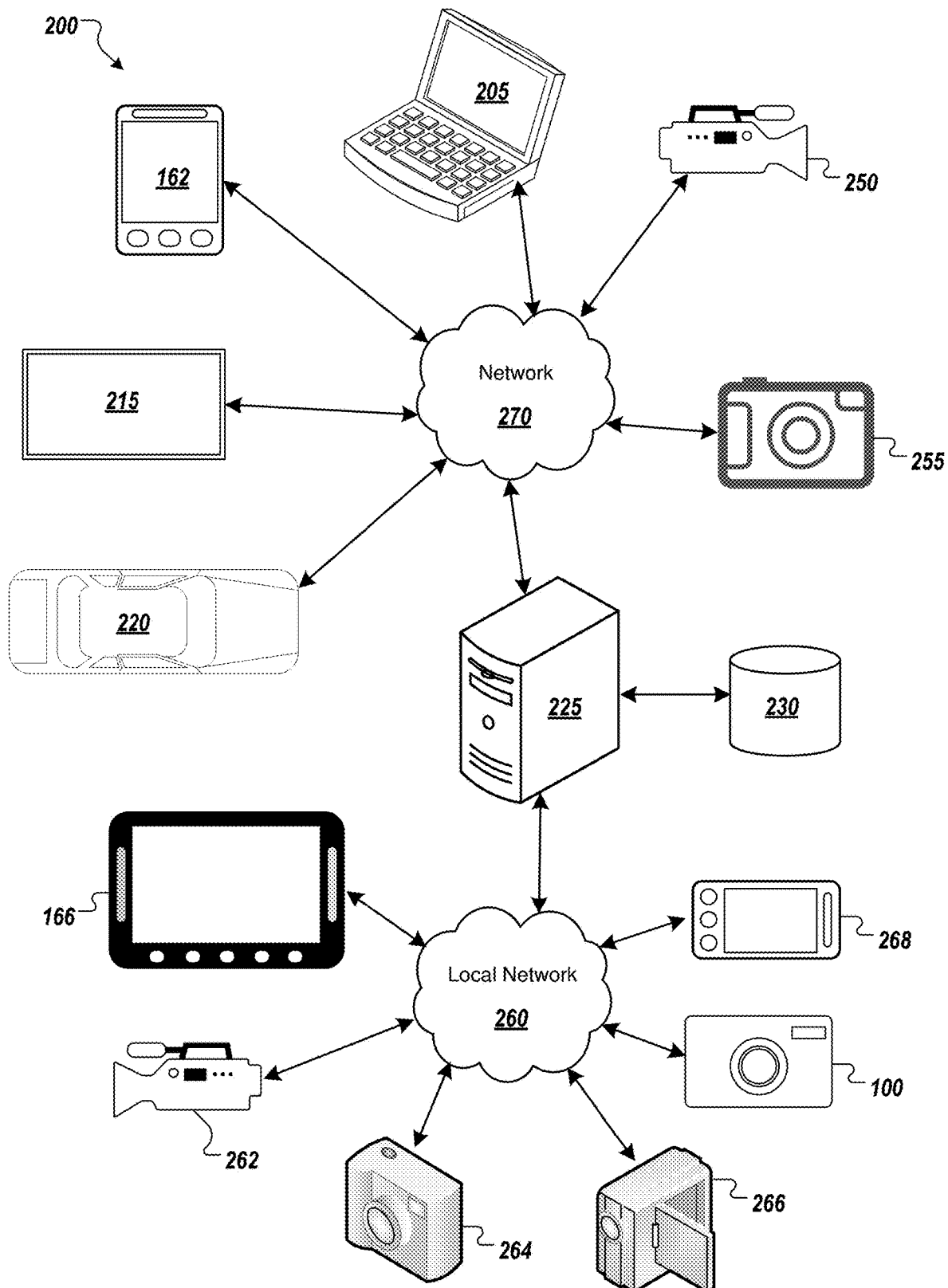
FIG. 2A shows an example environment suitable for some example implementations of the subject matter described herein.

FIG. 2A shows an example environment 200 suitable for some example implementations of the subject matter described herein. Environment 200 includes devices 100, 162, 166, 205-268, and each is communicatively connected to at least one other device via, for example, networks 270 and/or 260 (e.g., by wired and/or wireless connections). Some devices may be communicatively connected to one or more storage devices 230.

An example of one or more devices 162, 166, and 205-225 may be computing device 605 or the like described below in FIG. 6. Any of cameras 100, 250, 255, and 262-268 may also include a device or components of computing device 605 described below in FIG. 6. Environment 200 may include, but are not limited to, one or more computer mobile devices 162 and 166 (e.g., smartphones and tablets, etc.), computing device 205 (e.g., a laptop), a television 215, a device associated with a vehicle 220, a computer 225, storage device 230, cameras 100, 250, 255, and 262-268. Note that device 268 is a mobile device used as a camera, providing camera functions as described with camera 100.

In some implementations, devices 162, 166, and 205-220 may be considered user devices (e.g., devices used by users to access cameras 100, 250, 255, and 262-268). One or more cameras 100, 250, 255, and 262-268 may be associated with a device or apparatus (e.g., any other device shown in environment 200). For example, devices 225 and 230 may be associated with a service provider to provide images and/or videos using one or more of cameras 100, 250, 255, and 262-268 (e.g., device 225 may manage and/or control one or more cameras 100, 250, 255, and 262-268 and/or manage and/or control access to one or more cameras 100, 250, 255, and 262-268 by other devices and/or users).

For example, users may use devices 162, 166, and 205-220 to access one or more cameras 100, 250, 255, and 262-268, such as to view image streaming, request/capture images, and/or record videos using one or more cameras, and/or to control one of more of the cameras 100, 250, 255, and 262-268. As used herein, "image streaming" or "streaming" refers to sending images from one device to another device. Each image may be referred to as a frame. The rate of images being sent or streamed is image per second or frame per second (fps), which is the number of images, or frames, that are sent or streamed from one device to another device. Streaming can be less than 1 fps (e.g., 0.1 fps or one frame/image every 10 seconds), 1 fps, or any number of fps (e.g., 2, 3, 5, 8, 10, 15, 24, 25, 29.97, 30, 60, 90, 120, 240, etc.). In some implementations, streaming fps may vary, such as when images are streamed or sent when available or on demand.

Figure 2B:
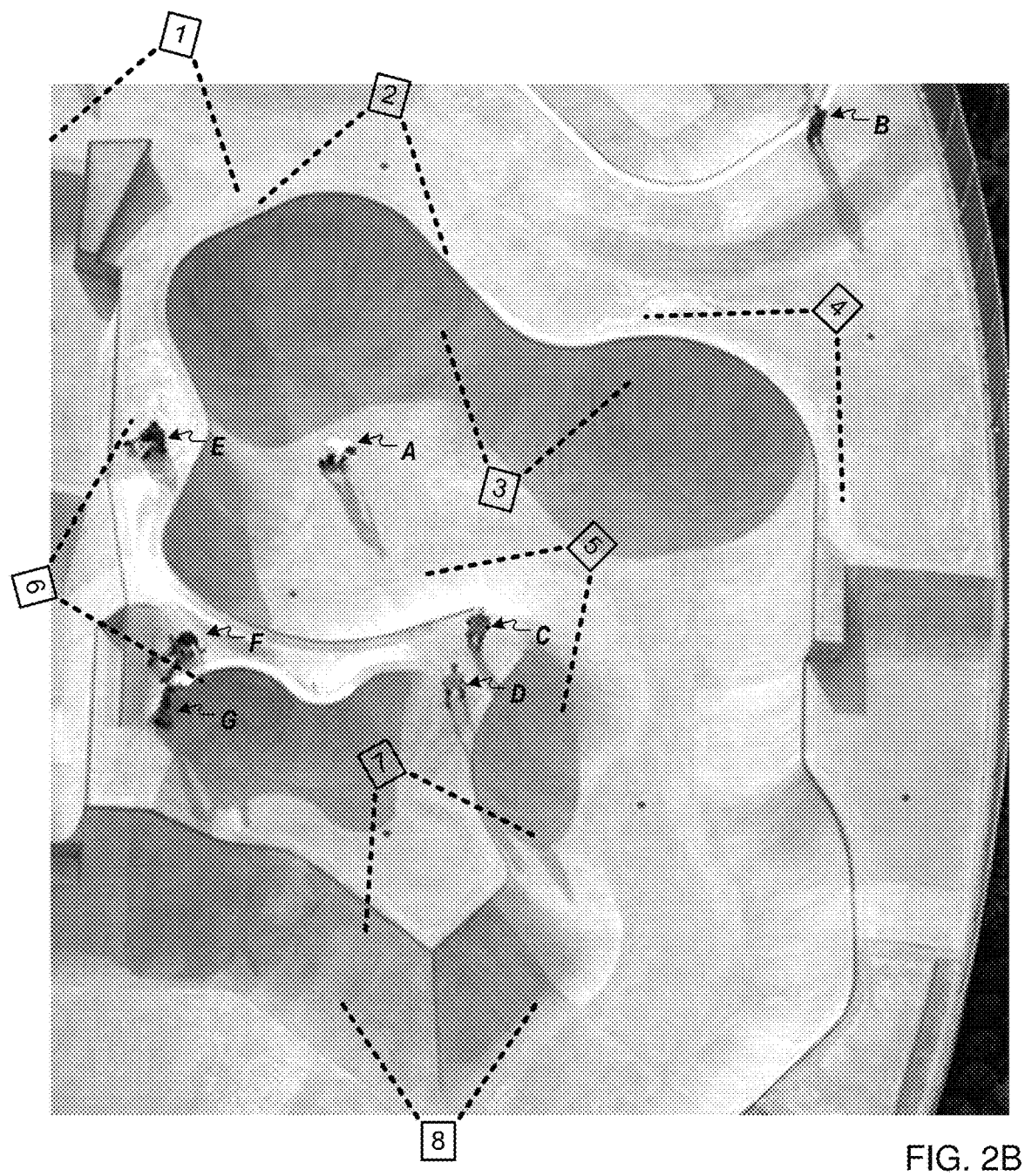
FIG. 2B shows an example environment where the subject matter described herein may be implemented.

FIG. 2B shows an example environment where the subject matter described herein may be implemented. FIG. 2B shows a bird's-eye view of a venue (e.g., a skate park) in which cameras (e.g., cameras 1-8) are positioned (e.g., mounted on overhead wires, walls, poles, drones, etc.) to allow skaters and spectators (e.g., users A-G) to access one or more cameras. For example, access to cameras 1-8 may be provided for a fee or as a service of the venue. When a user wants to access any camera, a tag (e.g., tag 142) may be activated to associate with a device of the user or an account of the user (described in FIGS. 3A-D). Some cameras may be accessed by providing information of the tag to the cameras (e.g., cameras receive the tag). Some cameras may be accessed by tag detection, and the user is provided to with the tag. One or more users A-G may carry tags associated devices and/or users to access the cameras as described herein.

For example, user A may carry a tag that automatically triggered at least some of cameras 1-8 to take images and/or videos. Users C and D may carry tags that allow them to control camera 5 to take images and/or videos.

In some implementations, a camera may detect movement of a tag. The movement detection (e.g., using infrared, global positioning system (GPS), and/or other technology) may be implemented with any features and/or functions provided by a camera. For example, users E and F may carry tags that automatically triggered (e.g., first trigger) at least some of cameras 1-8 to take images and/or videos (e.g., camera 6). The automatic triggered image and/or video capturing may be implemented to use movement detection. For example, if user E or F is detected to be not in motion, image and/or video capturing is not automatically triggered (e.g., second trigger). In motion may be referred to as a user (e.g., the tag associated with the user) being at two different locations in two points in time.

Figure 2C:
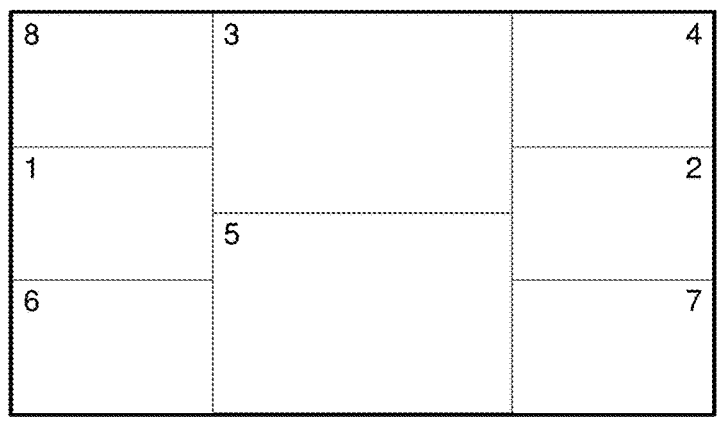
FIG. 2C shows an example display for viewing images and/or image streaming according to some example implementations.

FIG. 2C shows an example display for viewing images and/or image streaming according to some example implementations. The display show eight sub-windows, for example, one for each of the cameras 1-8 in FIG. 2B. For example, use A, who carries a tag that automatically triggered at least some of cameras 1-8 to take images and/or videos, travels through a course in the field of views of the cameras. As user A travels in the field of view of camera 1, an image or video of user A is send to sub-window 1. As the user A travels in the field of view of camera 2, an image or video of user A is send to sub-window 2, etc. Since the user's tag is not detected by all the cameras at the same time, the scenes covered by cameras 1-8 are not shown in sub-windows 1-8 at the same time. If more than one tag is activated (described in FIGS. 3A-D) and detected by two or more cameras, the sub-windows associated with those cameras (e.g., activated by the tags) may show images of the field of views of those cameras simultaneously.

Figure 3A:
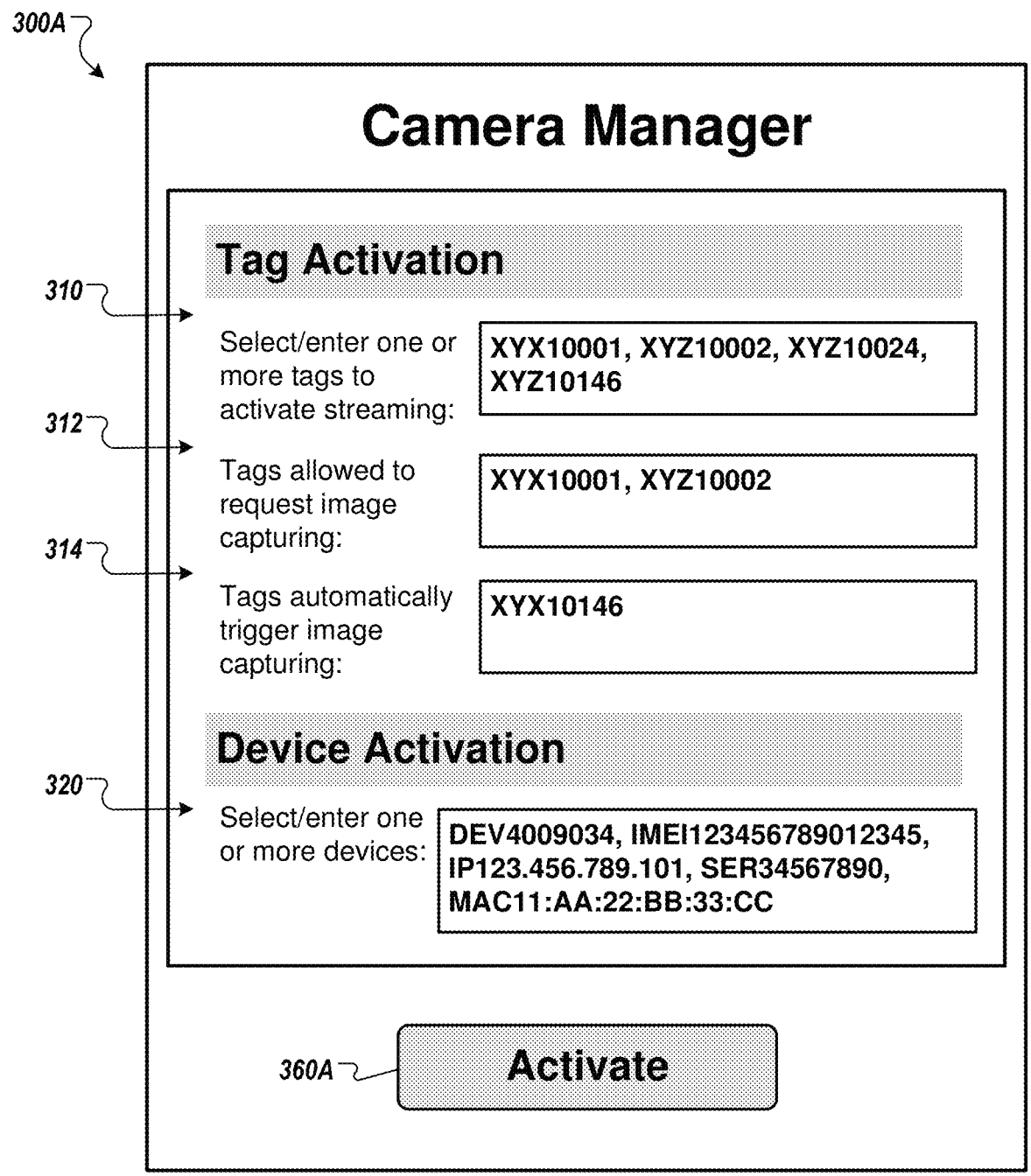
FIG. 3A shows a first example user interface according to some example implementations.

FIG. 3A shows a first example user interface according to some example implementations. User interface (UI) 300A may be used to activate a tag (e.g., tag 142) and/or a device (e.g., device 162) to access a camera (e.g., camera 100). UI 300A may be used to manage the access of one camera (e.g., camera 100). As used herein, "active" refers to activation, registration, and/or authorization. To activate a tag, unique information of the tag (e.g., serial number, unique identifier, etc.) may be entered in appropriate areas 310-314 of the UI based on the desired functions. For example, a tag may be activated to receive or access image streaming 310 (e.g., viewing what the camera "sees"). A tag may be activated to request images and/or videos 312. A tag may be activated to automatically trigger image and/or video capturing 314 (e.g., capture one or more images, such as a burst of three images, and/or capture a 10-second video or a video of other length).

In some implementations, a device may be activated by entering unique device identification information (e.g., serial number, International Mobile Station Equipment Identity (IMEI) information, internet protocol (IP) address, media access control (MAC) address, etc.) of the device in area 320 of the UI. The UI allows association of one or more tags and their functions with one or more devices.

As shown in FIG. 3A, after activation (e.g., after "Activate" button 360A is pressed), the tags entered in areas 310-314 are activated. Whenever one of the activated tags entered in area 310 is received or detected by or for camera 100, view of camera 100 is streamed to the device or devices activated in area 320 after connectivity for communication is established. Whenever camera 100 receives a request to capture an image or video from a device activated in area 320, if the device is associated with a tag activated in area 312, camera 100 captures an image or video and provides the captured image or video to and/or for access by the devices activated in area 320. Whenever one of the activated tags entered in area 314 is received or detected by or for camera 100, camera 100 automatically capture one or more images and/or video and provide the captured images and video to and/or for access by the devices activated in area 320. In some implementations, streaming is implied or automatic when a tag is entered in area 312 or 314 (e.g., tags "XYX10001", "XYZ10002", and "XYX10146" do not need to be entered in area 310 since they are entered in area 312 or 314).

In some implementations, the UI may allow or require activation of one or more users (e.g., allowing the users to access the camera). For example, the UI may include area 350 shown in UI 300D of FIG. 3D. In area 350, to activate a user, the user's identification information may be entered (e.g., user name, email address, telephone number, etc.).

If a user is activated in area 350, whenever one of the activated tags entered in area 310 is received or detected by or for camera 100, view of camera 100 is streamed to the activated user if the user is detected (e.g., logged on or otherwise available). Whenever camera 100 receive a request to capture an image or video from a device activated in area 320, if the activated user is associated with a tag activated in area 312, camera 100 capture an image or video and provide the captured image or video to and/or for access by the activated user. Whenever one of the activated tags entered in area 314 is received or detected by or for camera 100, camera 100 automatically capture one or more images and/or video and provide the captured images and video to and/or for access by the activated user.

Figure 3B:
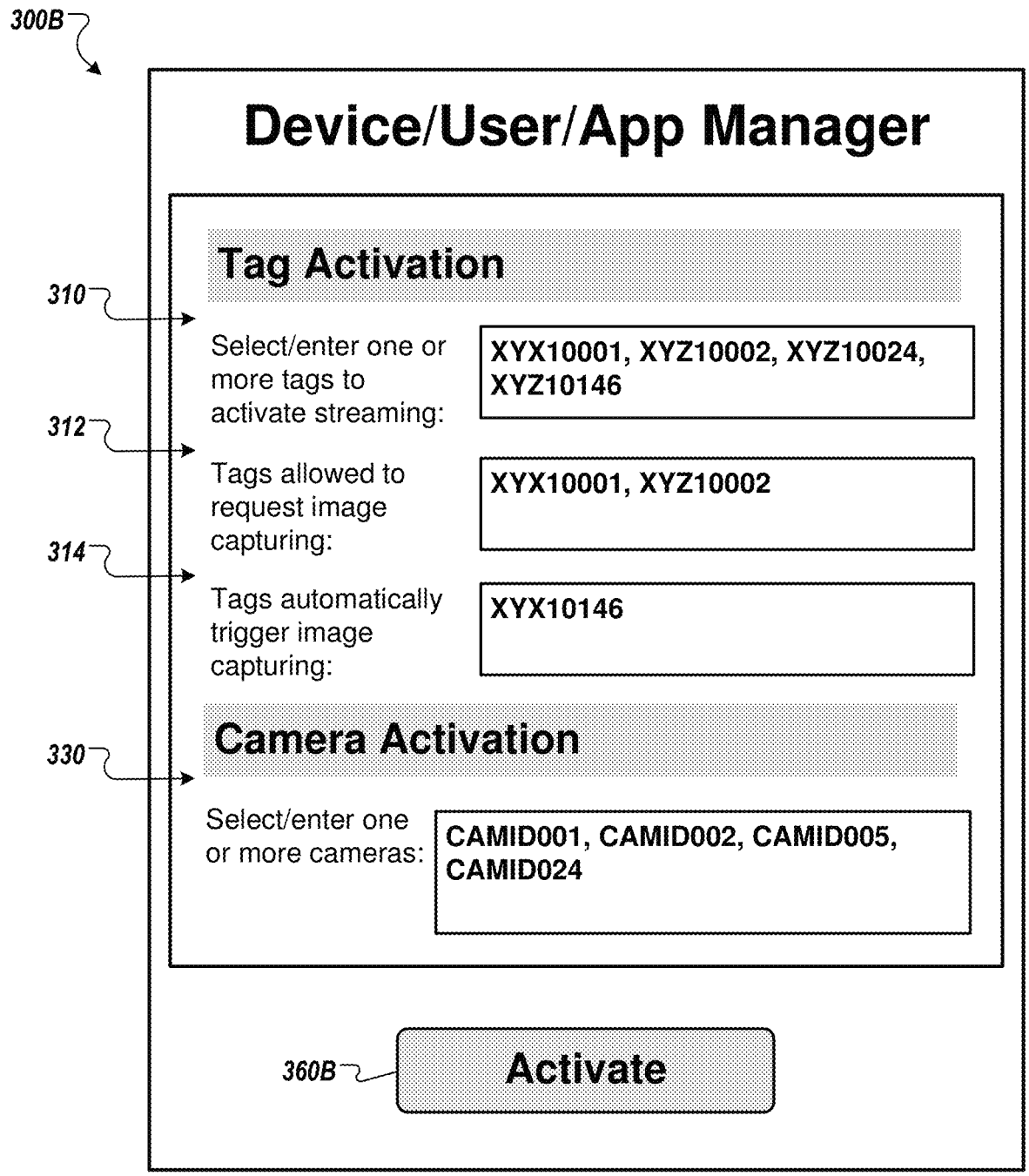
FIG. 3B shows a second example user interface according to some example implementations.

FIG. 3B shows a second example user interface according to some example implementations. UI 300B may be used to activate a device (e.g., device 162 or 166), a user, and/or an application (app) used to access one or more cameras. UI 300B may be used to manage or authorize communication between a device (e.g., the device executing the like of UI 300B, e.g., a device having ID "DEV4009034" which is activated in FIG. 3A above), a user (associated with the execution of the like of UI 300B), or an app (that includes the like of UI 300B) and one or more cameras activated in area 330. UI 300B may have the equivalent of one or more areas 310-314 described above. In some implementations (e.g., where two-way authorization is desired for establishing communication), the UI 300B may allow or require activation of one or more cameras in area 330 (e.g., to access the cameras, e.g., communicated with the cameras). For example, to activate a camera, the camera's identification information may be entered (e.g., serial number, or unique identifier provided by the camera, etc.). "CAMID001" may be the identification number of camera 100, for example.

As shown in FIG. 3B, after activation (e.g., after "Activate" button 360B is pressed), camera "CAMID001" (camera 100) is activated to communicate with device DEV4009034 (the device associated with UI 300B). That is, communication from and to camera 100 is authorized, accepted, or otherwise allowed by device DEV4009034. Note that in FIG. 3A above, device DEV4009034 is activated on the side of camera 100. That is, communication to and from device DEV4009034 is authorized, accepted, or otherwise allowed by camera 100. If UI 300B is associated with another device, a user, or an app, then communication is authorized, accepted, or otherwise allowed between the devices (e.g., cameras) in area 330 and the another device, a user, or an app.

In some implementations, a camera can establish communication (e.g., streaming video or images) with a device, user, or app without needing activation of the camera by the device, user, or app (e.g., no need to activate the camera in, for example, area 330 of using UI 300B). In some implementations, a camera needs to be activated (e.g., activated using the like of area 330 of using UI 300B) before communication with the camera is authorized, accepted, or otherwise allowed.

In some implementations, UI 300B may include the equivalent of one or more areas 310-314 for activating, registering, or otherwise associating tags entered in these areas with the device (e.g., device DEV4009034), user, or app associated with the like of UI 300B. Areas 310-314 in UI 300B allow a device, user, or app to manage or control which tag or tags, associated with which communication with a camera is authorized, accepted, or otherwise allowed (unless the camera is activated or regardless whether the camera is activated). For example, a tag (e.g., tag "ABCD4321") has not been activated in any area 310-314 or the like, but tags shown in areas 310-314 have been activated. When a camera, in a communication with device DEV4009034 (or a user or app), sends a streaming of the camera's scene, an image, or a video to DEV4009034. If the communication does not include any tag or includes tag "ABCD4321", device DEV4009034 rejects the communication (e.g., the communication from the camera would fail). If the communication includes one or more tags activated in any area 310-314, device DEV4009034 accepts the communication (e.g., the communication from the camera would succeed or establish).

In some implementations, there is no association of functions with tags on the side of a device, user, or app that receives content from a camera. In these implementations, areas 312 and 314 are not implemented, and area 310 is implemented to allow entering of tags but is not associated with any function, such as streaming. In other implementations, functions are associated with tags, as shown in areas 310-314. In some implementations, streaming is implied or automatic when a tag is entered in area 312 or 314 (e.g., tags "XYX10001", "XYZ10002", and "XYX10146" do not need to be enter in area 310 since they are entered in area 312 or 314).

Figure 3C:
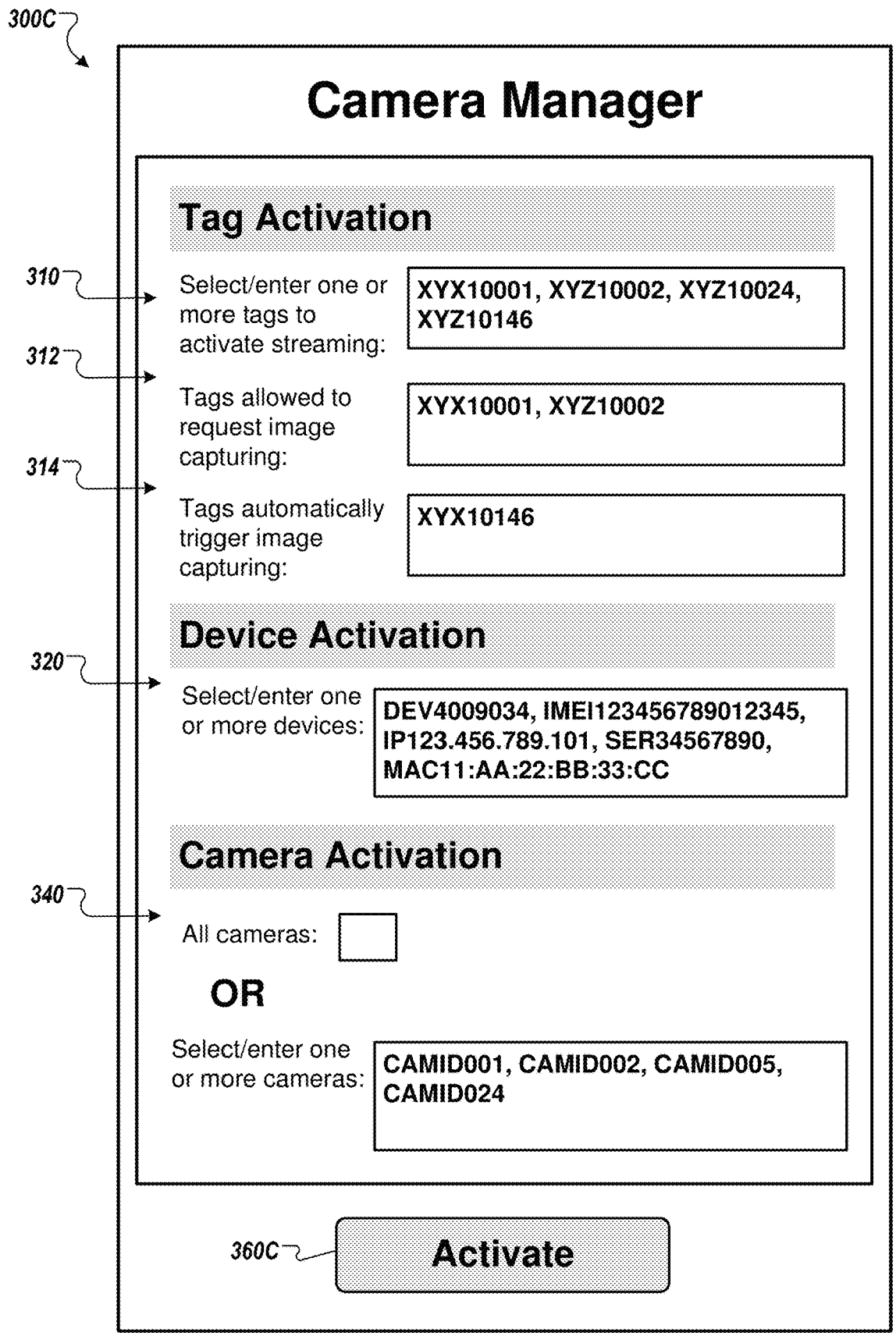
FIG. 3C shows a third example user interface according to some example implementations.

FIG. 3C shows a third example user interface according to some example implementations. UI 300C may be used to activate tags in areas 310-314 and/or devices in area 320 to associate with or access to one or more cameras in area 340, which may be managed and/or controlled by a device, system, or apparatus (e.g., device 255). UI 300C is shown to include the same areas 310-320 as UI 300A. UI 300C may be used (e.g., in association with device 225 that manages/controls one or more cameras) to activate tags in areas 310-314 and/or devices in area 320 to associate with or access one or more cameras in area 340 (four cameras with IDs "CAMID001", "CAMID002", "CAMID005", and "CAMID024", e.g., cameras 100, 250, 255, and 262-268). For example, in addition to areas 310-320 shown with UI 300A, identifications of one or more cameras (e.g., cameras 100, 250, 255, and 262-268) may be entered in area 340 of UI 300C.

Figure 3D:
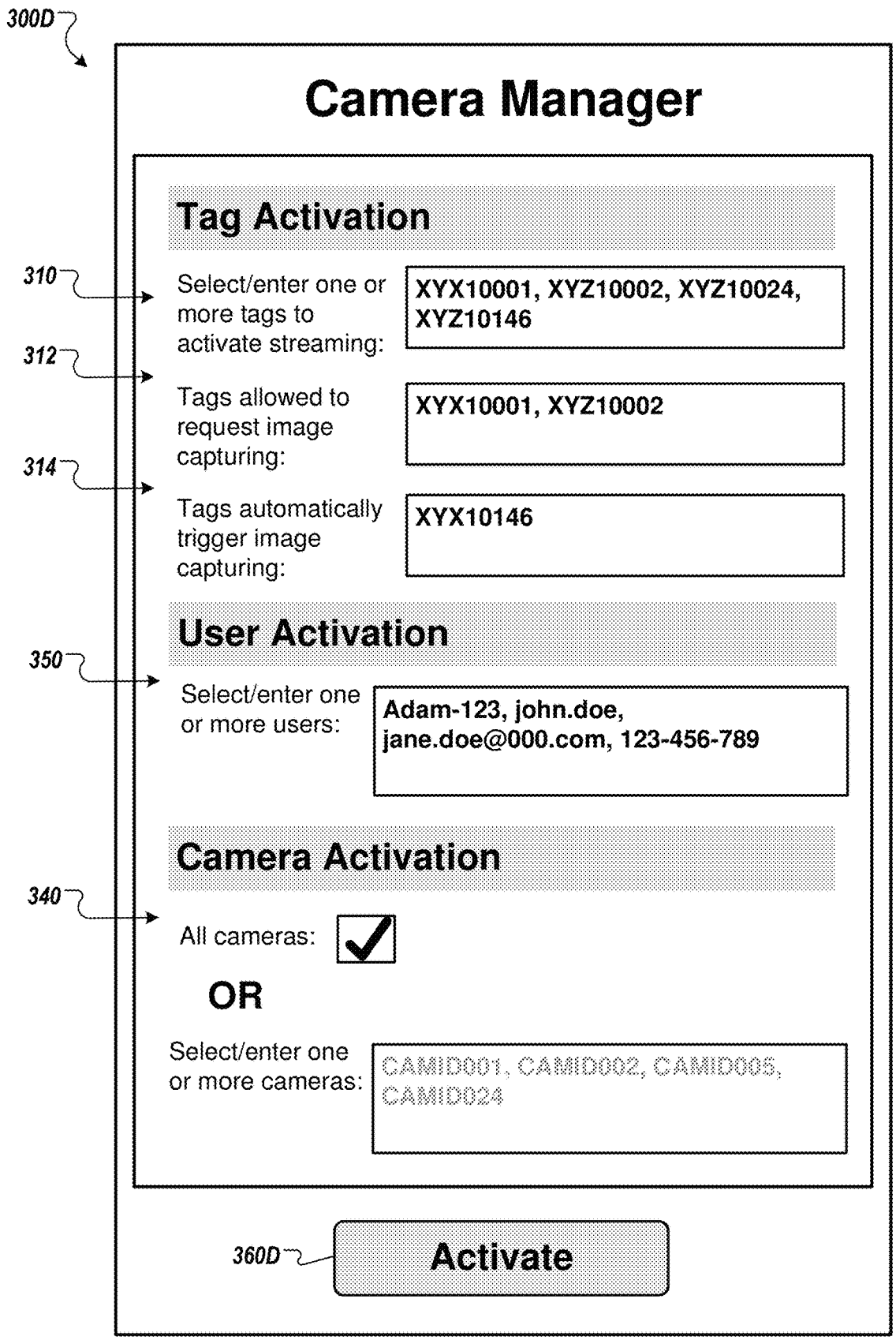
FIG. 3D shows a fourth example user interface according to some example implementations.

FIG. 3D shows a fourth example user interface according to some example implementations. UI 300D may be used to activate tags in areas 310-314 and/or users in area 350 to associate with or access to one or more cameras in area 340, which may be managed and/or controlled by a device, system, or apparatus (e.g., device 255). UI 300D is the same as UI 300C, with the exception of area 350 used to activate users, as described above in FIG. 3A.

FIG. 4A shows a flowchart of an example process implementation for associating cameras with tags, devices, and/or users according to some example implementations. Process 400 may be implemented using a camera (e.g., camera 100) or a device (e.g., device 225) that manages cameras. Process 400 includes associating one or more tags (e.g., in areas 310-314) with one or more cameras at block 410 (e.g., from the use of the like of UI 300A, 300C, and/or 300D). At block 420, one or more user and/or devices (e.g., in areas 320 and/or 350) may be associated with one or more tags (e.g., in areas 310-314).

In some implementations, one or more user and/or devices (e.g., in areas 320 and/or 350) may be associated with one or more cameras (e.g., from the use of the like of UI 300A, 300C, and/or 300D), at block 430. Blocks 410-430 may be implemented using, for example, UI 300A, 300C, and/or 300D.

In some implementations, functions, meanings, or definitions of the associations performed in blocks 410, 420, and/or 430 may be fine-tuned or further defined. For example, functions of the associated tags may be changed, added, or removed. Associated users may be limited to access the associated cameras or images and videos captured by the cameras using certain devices, from certain geographical locations, etc. Associated devices may be required to meet certain conditions. Captured images and videos may be imposed certain conditions and/or rules for sharing with other users. The number of devices and/or users may be imposed.

In some examples, the process 400 may be implemented with different, fewer, or more blocks. The process 400 may be implemented as computer executable instructions (program code), which can be stored on a medium, loaded onto one or more processors of one or more computing devices, and executed as a computer-implemented method. The one or more processors provide the means for implementing at least some of process 400.

FIG. 4B shows a flowchart of an example process implementation for associating devices and/or users with cameras and/or tags according to some example implementations. Process 450 may implements, for example, the UI 300B (FIG. 3B). Process 450 includes associating one or more tags (e.g., in areas 310-314) with one or more cameras (e.g., in area 330) at block 460. In some implementations, one or more users and/or devices (e.g., associated with the execution of the like of UI 300B) may be associated with one or more cameras (e.g., in area 330 of UI 300B), at block 470. In some implementations, functions, meanings, or definitions of the associations performed in blocks 460 and/or 470 may be fine-tuned or further defined at block 480, as described in block 440.

In some examples, the process 450 may be implemented with different, fewer, or more blocks. The process 450 may be implemented as computer executable instructions (program code), which can be stored on a medium, loaded onto one or more processors of one or more computing devices, and executed as a computer-implemented method. The one or more processors provide the means for implementing at least some of process 450.

Figure 5:
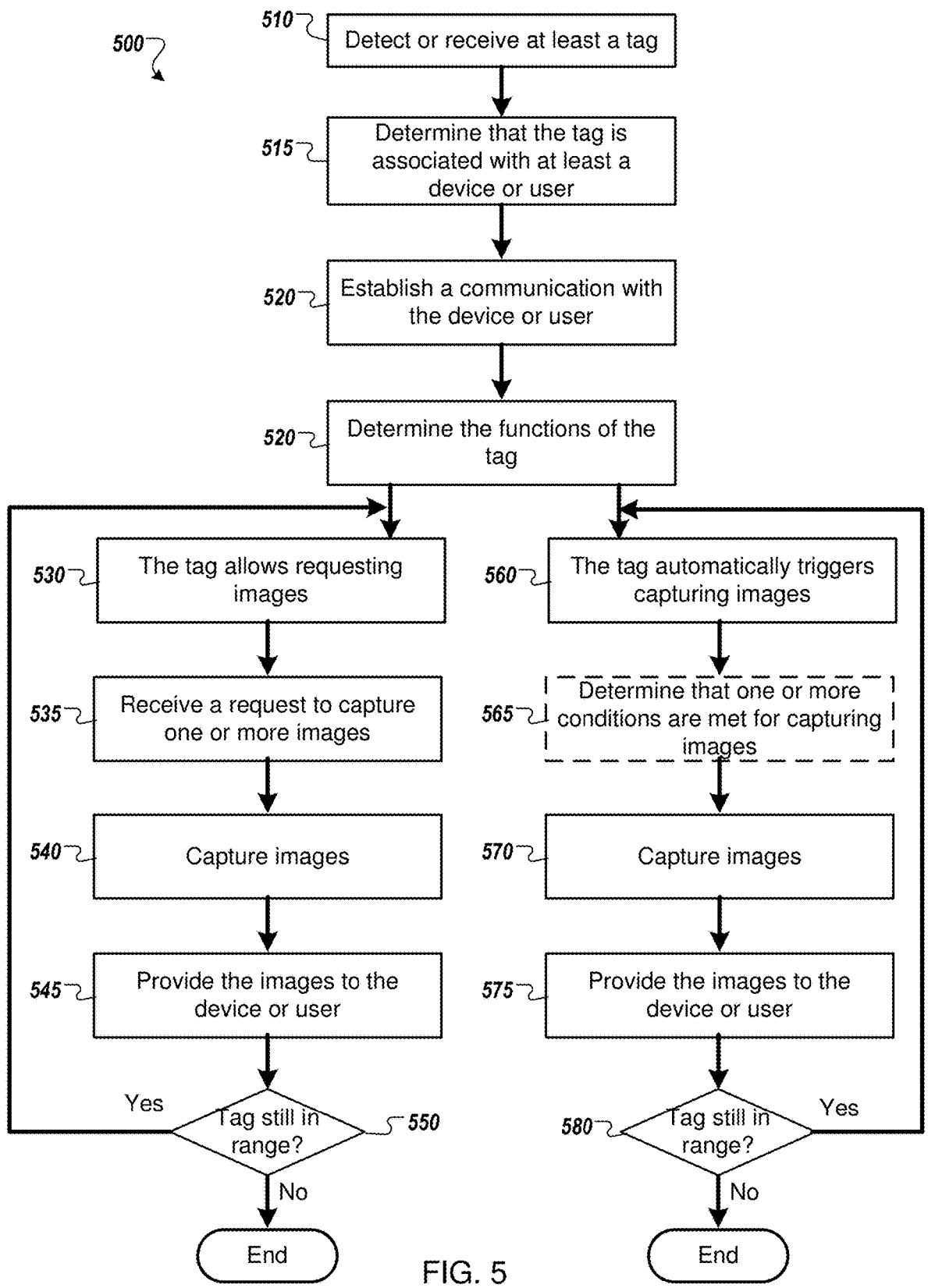
FIG. 5 shows a flowchart of an example process implementation for capturing and/or streaming images according to some example implementations.

FIG. 5 shows a flowchart of an example process implementation for capturing and/or streaming images and/or videos according to some example implementations. Process 500 may be implemented using a camera (e.g., camera 100) or a device (e.g., device 225) that manages cameras. Process 500 includes detecting or receiving at least one tag at block 510. At block 515, process 500 determines that the tag is associated with at least one device or user. At block 520, communications with the device or user are established. The communications may include streaming of the view of cameras that detected or received the tag to the device or user. At block 520, functions of a detected tag is determined. The functions include but are not limited to requesting images 530 (which include still images and/or videos) and automatic image capturing 560.

If a tag is associated with the function of requesting images and/or videos, process 500 flows to block 530. When a request to capture images and/or videos is received at block 535, the images and/or videos are captured at block 540 (e.g., by or using the camera or cameras that detected or received the tag). The captured images and/or videos are provided to the associated devices and/or users at block 545. If the tag is still in range at 550 (e.g., still detectable or not removed or canceled by a user or not expired), the sub-process of blocks 530-545 continues to loop until the tag is out of range or removed or canceled by a user or expired.

From block 520, if a tag is associated with the function that automatically triggers image capturing, process 500 flows to block 560. In some implementations, one or more conditions must be met before images (which include still images and/or videos) are automatically captured. For example, one condition may be that a tag is detected for at least a certain duration (e.g., 0.1 second) before images are captured (e.g., to prevent capturing of images of a subject flying across the field of view of a camera in less than 0.1 second). Another condition may be that the subject is in motion or not still, to prevent repeatedly capturing of images of a subject resting in front of a camera. Any other conditions may be implemented.

If one or more conditions are implemented, process 500 determines that the conditions are met at block 565 before capturing the images and/or videos automatically (e.g., without input from any user) at block 570. The captured images and/or videos are provided to the associated devices and/or users at block 575. If the tag is still in range at 580 (e.g., still detectable or not removed or canceled by a user or not expired), the sub-process of blocks 560-575 continues to loop until the tag is out of range or removed or canceled by a user or expired.

In some examples, the process 500 may be implemented with different, fewer, or more blocks. The process 500 may be implemented as computer executable instructions (program code), which can be stored on a medium, loaded onto one or more processors of one or more computing devices, and executed as a computer-implemented method. The one or more processors provide the means for implementing at least some of process 500.

Figure 6:
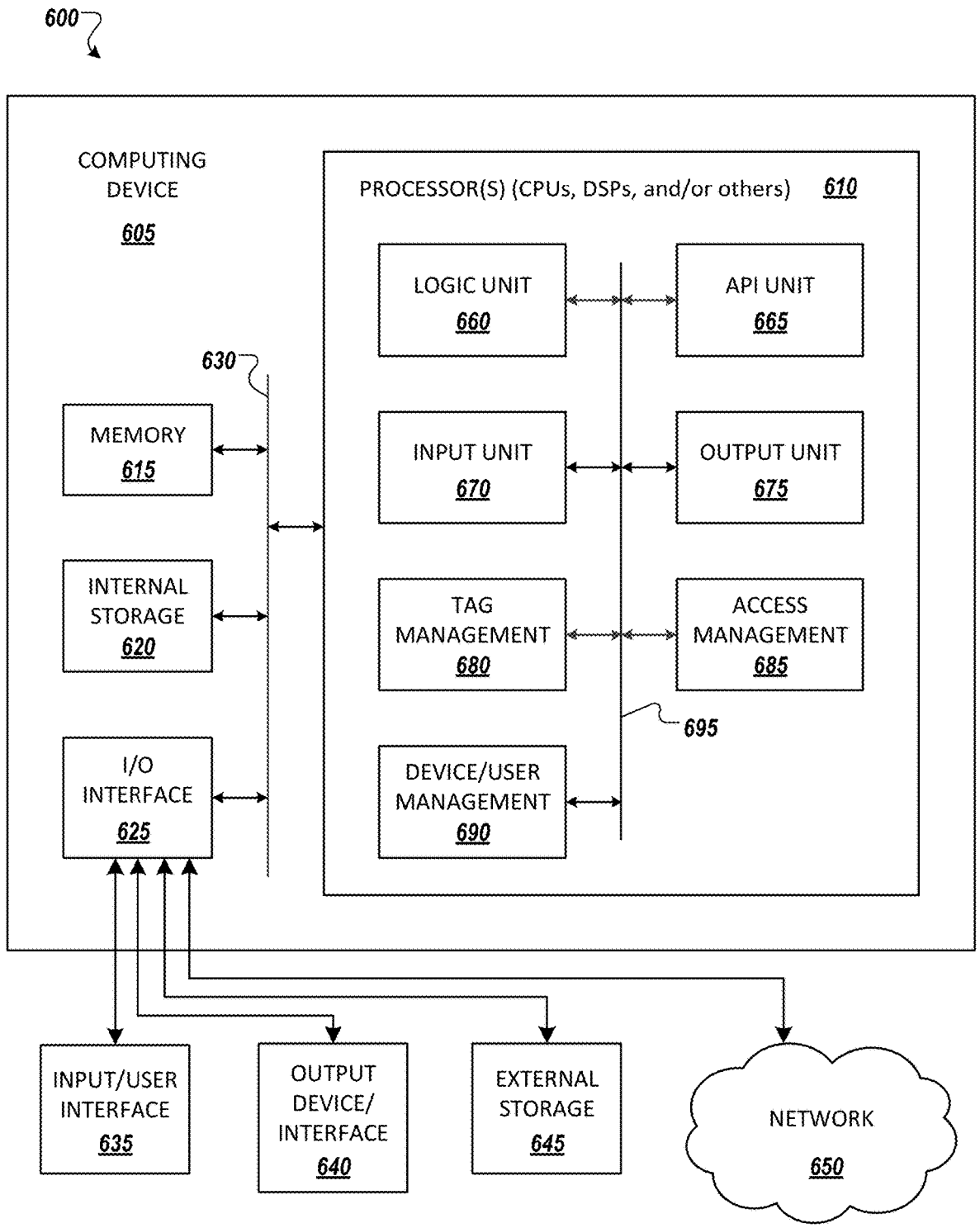
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions (program code) can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others). The executable instructions when executed on at least one processor 610 are configured to cause the computing device 605 to perform at least some of the example implementations (e.g., methods) described herein.

Processor(s) 610 can execute under any operating system (OS) (not shown), in a native or virtual environment. One or more applications can be deployed that include logic unit 660, application programming interface (API) unit 665, input unit 670, output unit 675, tag management 680, access management 685, device/user management 690, and inter-unit communication mechanism 695 for the different units to communicate with each other, with the OS, and with other applications (not shown). For example, tag management 680, access management 685, and device/user management 690 may implement one or more processes and/or UI shown and described in FIGS. 1-5. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, tag management 680, access management 685, and device/user management 690). For example, when tag management 680 detects or receives a tag through input unit 670, a determination is made by device/user management 690 to determine or identify one or more devices and/or users associated with the tag. access management 685 then manages access by the associated devices and/or users based on the tag (e.g., the functions of the tag and association conditions or definitions).

In some instances, logic unit 660 may be configured to control the information flow among the units and direct the services provided by API unit 665, input unit 670, output unit 675, tag management 680, access management 685, and device/user management 690 in some example implementations described above. For example, the flow of one or more processes or implementations may be controlled by logic unit 660 alone or in conjunction with API unit 665.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those of ordinary skill familiar with this field that changes may be made in these example implementations without departing from the subject matter described herein as defined in the appended claims and their equivalents.

What is claimed is:

1. An image capturing apparatus, comprising:
   a camera carried by an unmanned flying object,
   a memory comprises computer program code, and
   at least one processor configured to, with the computer program code, cause the apparatus to:
   associate a unique identifier of the first device with the camera;
   establish a first communication with the first device based on the unique identifier of the first device, where the first communication allows the first device to control the camera, wherein controlling the camera comprising one or more of: capturing an image using the camera, capturing a video using the camera, zooming the camera, panning the camera, and tilting the camera;
   associate a unique identifier of the second device with the camera; and
   establish a second communication with the second device based on the unique identifier of the second device, where the second communication allows the second device to control the camera, wherein controlling the camera comprising one or more of: capturing an image using the camera, capturing a video using the camera, zooming the camera, panning the camera and, tilting the camera.

2. The image capturing apparatus of claim 1, wherein
   the first communication comprises streaming a view from the camera to the first device; or
   the second communication comprises streaming a view from the camera to the second device.

3. The image capturing apparatus of claim 1, wherein the processor and the computer program code are further configured to cause the apparatus to:
   receive a request from the first device to capture an image or video;
   capture an image or video using the camera; and
   provide the image or video to the first device or a user.

4. The image capturing apparatus of claim 3, wherein provide the image or video comprises providing the image or video to a storage.

5. The image capturing apparatus of claim 1, wherein the processor and the computer program code are further configured to cause the apparatus to:
without receiving a request to capture an image or video, capture an image or video using the camera; and
provide the image or video to the first device or a user.

6. The image capturing apparatus of claim 1 further comprising a microphone, a speaker, or both.

7. A camera comprising:
a memory comprises computer program code, and
at least one processor configured to, with the computer program code, cause the camera to:
associate a unique identifier of the first device with the camera;
establish a first communication with the first device based on the unique identifier of the first device, where the first communication allows the first device to control the camera, wherein controlling the camera comprising one or more of: capturing an image using the camera, capturing a video using the camera, zooming the camera, panning the camera, and tilting the camera;
associate a unique identifier of the second device with the camera; and
establish a second communication with the second device based on the unique identifier of the second device, where the second communication allows the second device to control the camera, wherein controlling the camera comprising one or more of: capturing an image using the camera, capturing a video using the camera, zooming the camera, panning the camera and, tilting the camera.

8. The camera of claim 7, wherein
the first communication comprises streaming a view from the camera to the first device; or
the second communication comprises streaming a view from the camera to the second device.

9. The camera of claim 7, wherein the camera is carried by an unmanned flying object.

10. The camera of claim 7, wherein the processor and the computer program code are further configured to cause the camera to:
receive a request from the first device to capture an image or video;
capture an image or video using the camera; and
provide the image or video to the first device or a user.

11. The camera of claim 10, wherein provide the image or video comprises providing the image or video to a storage.

12. The camera of claim 7, wherein the processor and the computer program code are further configured to cause the camera to:
without receiving a request to capture an image or video, capture an image or video using the camera; and
provide the image or video to the first device or a user.

13. The camera of claim 7 further comprising a microphone.

14. The camera of claim 7 further comprising a speaker.

15. A method implemented using an apparatus comprising, the method comprising:
associating a unique identifier of the first device with the camera;
establishing a first communication with the first device based on the unique identifier of the first device, where the first communication allows the first device to control the camera, wherein controlling the camera comprising one or more of: capturing an image using the camera, capturing a video using the camera, zooming the camera, panning the camera, and tilting the camera;
associating a unique identifier of the second device with the camera; and
establishing a second communication with the second device based on the unique identifier of the second device, where the second communication allows the second device to control the camera, wherein controlling the camera comprising one or more of: capturing an image using the camera, capturing a video using the camera, zooming the camera, panning the camera and, tilting the camera.

16. The method of claim 15, wherein
the first communication comprises streaming a view from the camera to the first device; or
the second communication comprises streaming a view from the camera to the second device.

17. The method of claim 15, wherein the camera is carried by an unmanned flying object.

18. The method of claim 15, further comprising:
receiving a request from the first device to capture an image or video;
capturing an image or video using the camera; and
providing the image or video to the first device or a user.

19. The method of claim 15, wherein providing the image or video comprises providing the image or video to a storage.

20. The method of claim 15, further comprising:
without receiving a request to capture an image or video, capturing an image or video using the camera; and
provide the image or video to the first device or a user.

* * * * *